(12) United States Patent
Linga et al.

(10) Patent No.: US 7,273,513 B2
(45) Date of Patent: Sep. 25, 2007

(54) ACID GAS REMOVAL

(75) Inventors: Harald Linga, Nesttun (NO); Inge Sverre Lund Nilsen, Bergen (NO); Finn Patrick Nilsen, Bergen (NO); Trond Olav Høyland, Bergen (NO)

(73) Assignee: Statoil ASA, Stavanger (NO)

( * ) Notice: Subject to any disclaimer, the term of this patent is extended or adjusted under 35 U.S.C. 154(b) by 432 days.

(21) Appl. No.: 10/499,574

(22) PCT Filed: Dec. 20, 2002

(86) PCT No.: PCT/GB02/05878

§ 371 (c)(1),
(2), (4) Date: Nov. 29, 2004

(87) PCT Pub. No.: WO03/072226

PCT Pub. Date: Sep. 4, 2003

(65) Prior Publication Data

US 2005/0072300 A1    Apr. 7, 2005

(30) Foreign Application Priority Data

Dec. 21, 2001 (GB) ................................. 0130792.5

(51) Int. Cl.
*B01D 45/12* (2006.01)
*B01D 47/10* (2006.01)
*B01D 53/14* (2006.01)

(52) U.S. Cl. ............................ 95/235; 95/216; 95/236; 95/269; 96/189; 96/323; 55/339; 55/396; 55/457; 55/349; 261/DIG. 54

(58) Field of Classification Search ................... 95/235, 95/236, 266, 269; 96/234–271, 323; 261/DIG. 54; 423/228, 229
See application file for complete search history.

(56) References Cited

U.S. PATENT DOCUMENTS

| 4,100,257 A | 7/1978 | Sartori et al. |
| 5,820,837 A | 10/1998 | Marjanovich et al. |
| 6,277,343 B1 | 8/2001 | Gansley et al. |
| 6,514,322 B2 * | 2/2003 | West ........................... 95/269 |
| 6,576,029 B2 * | 6/2003 | West ........................... 55/349 |
| 6,699,308 B1 * | 3/2004 | Nilsen et al. ............... 95/216 |
| 7,018,451 B1 * | 3/2006 | Torkildsen et al. ......... 95/216 |

FOREIGN PATENT DOCUMENTS

| EP | 0 204 847 A3 | 12/1986 |
| SU |    212170 A | 4/1962 |
| SU |   1725988 A1 | 3/1990 |
| WO | WO 99/13966 A1 | 3/1999 |
| WO | WO 99/13969 A1 | 3/1999 |

* cited by examiner

*Primary Examiner*—Duane Smith
*Assistant Examiner*—Ives Wu
(74) *Attorney, Agent, or Firm*—Patterson, Thuente, Skaar & Christensen, P.A.

(57) ABSTRACT

The use of turbulent contactors to simultaneously absorb selected acid gas components from a gas stream and flash off hydrocarbons entrained in a liquid stream which include a solvent or reagent for the selected gas component. In particular, the method comprises feeding the gas stream and liquid stream into a first contactor where they are contacted co-currently and subjected to turbulent mixing conditions, and passing the multi-phase flow from the first contactor to a second contactor. The multi-phase flow from the second contactor is subsequently separated into a gas phase and a liquid phase.

15 Claims, 15 Drawing Sheets

ACID GAS REMOVAL

RELATED APPLICATION

This application claims priority to PCT Application No. PCT/GB02/05878 filed Dec. 20, 2002 and Great Britain Application No. 0130792.5 filed Dec. 21, 2001.

TECHNICAL FIELD

The present invention relates to a method for the simultaneous removal of acid gas components and hydrocarbons from a gas stream. In particular the invention relates to the selective removal of $H_2S$ over $CO_2$ using an amine.

BACKGROUND ART

Conventionally, acid gas components are removed using large absorption columns. These columns are designed to handle a gas feed at a certain flow rate and acid gas content. However changes to the feed conditions cause problems in operation and the absorber may have to be substantially modified to attain satisfactory or optimum performance. Problems where modification is required include, but are not limited to: an increase in the volumetric sour gas flow rate; a requirement for a lower acid gas concentration in the treated gas; a lower solvent circulation rate for the same level of purification; an increase in the acid gas concentration in the feed gas; any combination of the above. These problems with existing plants no longer being able to cope with changed working requirements may be summarised as bottlenecking and their solution as de-bottlenecking.

Modifications to the existing absorption columns and the associated apparatus are expensive and time consuming and many of the above variables can change on a regular basis. One of the current solutions employed to address the problem of needing to increase acid gas treating capacity is to change the solvent employed. However, this is not always appropriate and can introduce secondary problems such as regeneration considerations and corrosion problems. Another solution is to change the column internals from, for example, plates to random or structured packing. This option only has limited capacity for increasing the acid gas removal due to the overall size of the column.

The present invention therefore provides a method for increasing the acid gas absorption capacity of an existing plant and thereby de-bottlenecking plants.

A further problem with plants which have become bottlenecked is that hydrocarbons and carbon dioxide may become entrained and/or absorbed in the acid gas solvent (e.g. amine) and are therefore subsequently fed to the downstream treatment units such as a Claus sulphur recovery unit. These additional components in the feed to the Claus unit reduce the efficiency of the de-sulphurisation plant and may cause an additional bottleneck further down the process. There are also additional loads on the system involved in pumping this extra gas round the acid-gas solvent regeneration system and de-sulphurisation plant. This may overload the existing pumps and require the addition of more or replacement pumps.

SUMMARY OF THE INVENTION

The present invention provides a method for increasing the acid gas absorption capacity of an existing plant and thereby de-bottlenecking plants. In addition, the present invention provides a process in which the co-absorption of carbon dioxide and/or the entrainment of hydrocarbons is reduced or eliminated.

There is therefore a need for a process in which the co-absorption of carbon dioxide and/or the entrainment of hydrocarbons is reduced or eliminated. The present invention provides a method for doing this.

According to the present invention, there is provided a method for simultaneously absorbing selected acid gas components from a gas stream and flashing off hydrocarbons entrained in a liquid stream including a solvent or reagent for the selected gas component, in which: the gas stream and liquid stream are fed into a first contactor where they are contacted co-currently and subjected to turbulent mixing conditions; the multi-phase flow from the first contactor is passed to a second contactor comprising a housing adapted to be inserted into a pipe and to have a fluid flow pass therethrough, said housing comprising an inlet and an outlet opening respectively, the housing being provided with at least one interior moveable sealingly mounted regulating element partially enclosing a central chamber, to provide first wall portions associated with an upstream side of said housing, and second wall portions associated with a downstream side of said housing, said wall portions being provided with a number of through-going flow channels, each having a substantially smaller cross-sectional area than the flow cross-section of the inlet and outlet openings respectively, and in which the regulating element is adapted to be moveable in relation to said housing; and the multi-phase flow from the second contactor is separated into a gas phase and a liquid phase after the second contactor.

Using the method of the present invention, significant reductions in the quantity of hydrocarbon entrainment in the liquid stream can be obtained without any loss in performance of acid gas absorption. It is therefore possible to use semi-loaded liquid streams which have hydrocarbons entrained for the treatment of gas streams for the absorption of acid gas components. The method also provides benefits in the removal of the hydrocarbons thereby minimising problems further downstream where hydrocarbons may block the system or cause a further bottleneck.

Optionally the first contactor is a turbulent contactor having a contracting pipe section through which a gas stream flows, a liquid inlet arranged to produce an annulus of liquid around the internal perimeter of the pipe, a sharp edge at the end of the contracting pipe and a further pipe section downstream of the sharp edge.

Alternatively, the first contactor may comprise a vessel including a gas inlet, a liquid inlet and an outlet, the outlet leading to a venturi passage and a tube extending from the outlet back upstream, the tube being perforated and/or being spaced from the periphery of the outlet.

Alternatively, the first contactor is the same as the second contactor.

Preferably, $H_2S$ is selectively absorbed in preference to $CO_2$ from the gas stream. More preferably, the $H_2S$ level in the output gas stream from the second contactor is less than 1.5% by volume, even more preferably less than 1% by volume.

Preferably, the liquid stream is an amine stream including entrained hydrocarbons. Optionally, the liquid stream (including entrained hydrocarbons) is fed directly to the first contactor from a liquefied petroleum gas (LPG) de-sulphurisation train. Preferably, the amine is selected from MEA, DEA, DIPA and MDEA.

Preferably, the liquid phase is treated to remove any absorbed gas component. This treatment may be by any suitable means as are known. The treated amine, now clear of sour gas components, may be recycled to the gas treatment system. The sour gas mixture from the treated amine may be passed to any suitable downstream treatment plant such as a Claus plant to convert the $H_2S$ into environmentally acceptable products.

Preferably, at least 70%, more preferably 80% and more preferably still 90% of the hydrocarbons in the liquid feed are flashed off into the gas stream in the contactor unit.

The present invention also extends to the apparatus for use in the method of the present invention. In particular, according to the present invention there is provided apparatus for the simultaneous absorption of selected acid gas components from a gas stream and flashing off hydrocarbons entrained in a liquid stream including a solvent or reagent for the selected gas component comprising: a first co-current contactor where the gas stream and the liquid stream are subjected to turbulent mixing conditions; a second co-current contactor comprising a housing adapted to be inserted into a pipe and to have a fluid flow pass therethrough, said housing comprising an inlet and an outlet opening respectively, the housing being provided with at least one interior moveable sealingly mounted regulating element partially enclosing a central chamber, to provide first wall portions associated with an upstream side of said housing, and second wall portions associated with a downstream side of said housing, said wall portions being provided with a number of through-going flow channels, each having a substantially smaller cross-sectional area than the flow cross-section of the inlet and outlet openings respectively, and in which the regulating element is adapted to be moveable in relation to said housing; and means for separating the multi-phase flow from the second contactor into a gas phase and a liquid phase.

Optionally, the first contactor is a turbulent contactor having a contracting pipe section through which a gas stream flows, a liquid inlet arranged to produce an annulus of liquid around the internal perimeter of the pipe, a sharp edge at the end of the contracting pipe and a further pipe section downstream of the sharp edge.

Alternatively, the first contactor comprises a vessel including a gas inlet, a liquid inlet and an outlet, the outlet leading to a venturi passage and a tube extending from the outlet back upstream, the tube being perforated and/or being spaced from the periphery of the outlet or the first contactor is the same as the second contactor.

BRIEF DESCRIPTION OF THE DRAWINGS

The invention may be put into practice in various ways and a number of specific embodiments will be described by way of example to illustrate the invention with reference to the accompanying drawings, in which:

FIG. 4b is a schematic representation of the break up of the liquid film into droplets in the 10 turbulent contactor of FIG. 4a;

FIG. 5b is a variant of the contactor shown in FIG. 5a;

DETAILED DESCRIPTION

Figure 1:
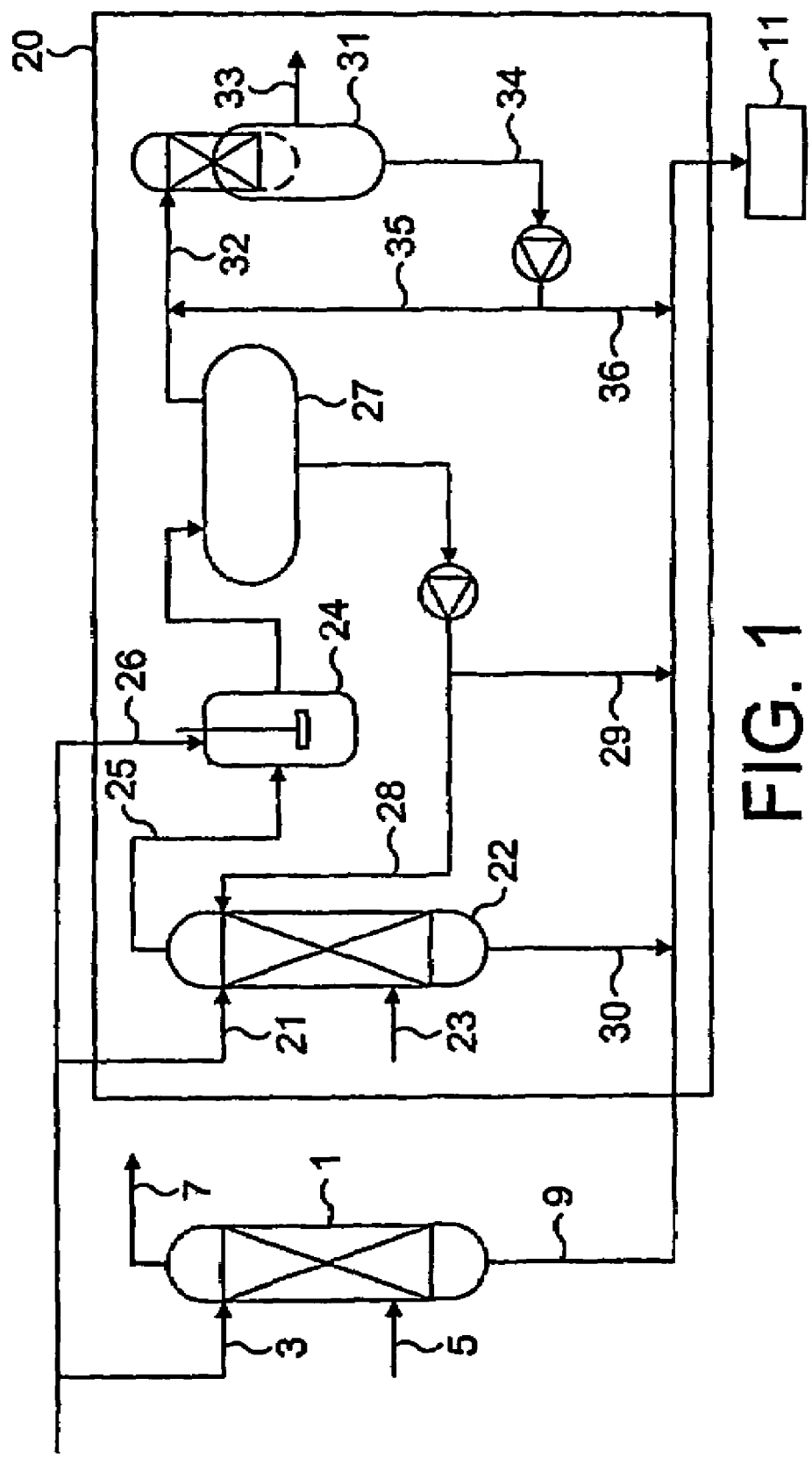
FIG. 1 shows a process configuration for a portion of a possible existing acid gas treatment plant which is bottlenecked.

FIG. 1 shows an example of an acid gas treatment plant which is bottlenecked. A conventional counter-current absorption column 1 is fed with lean amine solvent via stream 3 and with a feed gas via stream 5. The treated gas is removed via stream 7 and may be subject to further treatment as is known. The used amine is removed via stream 9 and is fed to an amine regeneration unit 11.

The lean amine solvent is also fed to a liquefied petroleum gas (LPG) treatment unit indicated by the box 20 in FIG. 1. The amine is fed via stream 21 to a counter-current column 22 to which LPG gas is also fed via stream 23. The treated gas is fed to a mixer 24 via stream 25 where it is mixed with further lean amine fed via stream 26 before being passed to a settler 27 where the two-phase mixture is allowed to settle. Some of the removed used amine may be fed back to the column 22 via stream 28, but most of it is passed to the amine regeneration unit 11 via stream 29. Used amine from the column 22 also passes directly to the regeneration unit 11 via stream 30. The gas stream from the settler is then passed to a coalescer 31 via stream 32. The treated gas is then taken off via stream 33 and may be subject to further treatment or used directly as appropriate. The liquid stream 34 from the coalescer 31 is partly recycled to the coalescer via stream 35 and partly sent to the regeneration unit 11 via stream 36. It can be seen that a significant quantity of amine is used once and subsequently sent directly to the regeneration unit. This produces a heavy liquid load on the system which is controlled by pumps and valves (not shown).

Figure 2:
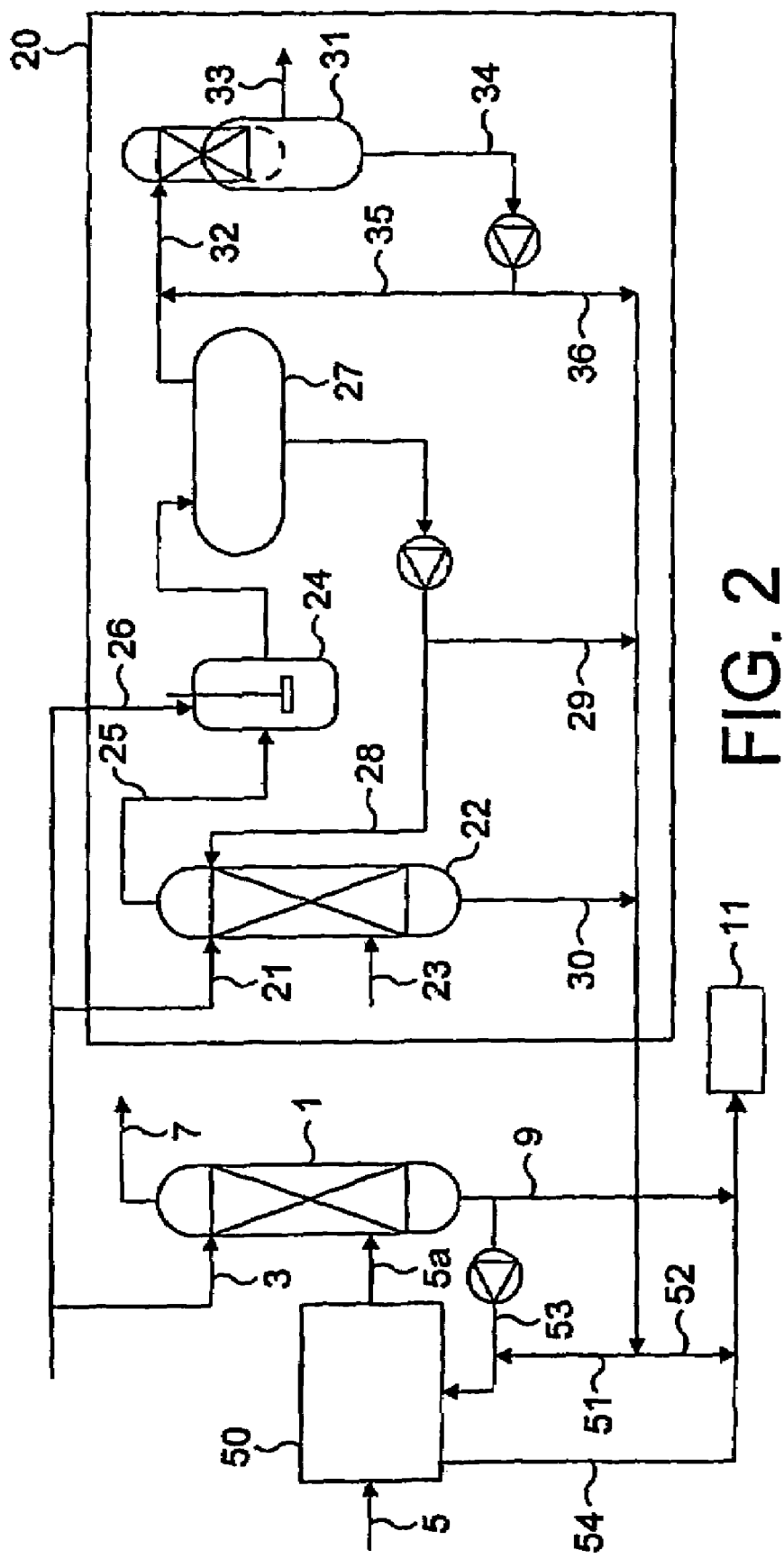
FIG. 2 shows a process configuration exemplifying the present invention utilising solvent integration.

FIG. 2 shows a similar operating system in which a unit according to the present invention is added before the conventional counter-current column 1 for the treatment of the feed gas. Instead of streams 29, 30 and 36 passing directly to the amine regeneration unit 11, they are fed to an additional contactor unit 50 via stream 51. Some will still be passed directly to the regeneration unit 11 via stream 52. The contactor unit 50 is also fed by some of the used amine from the contactor 1 via stream 53. This semi-lean amine from the four sources is fed to the contactor unit 50 where it is contacted co-currently with the feed gas 5. The unit comprises two mixers, the second of which is an in-line mixer such as that shown in FIGS. 3a, 3b and 3c. The first mixer may be any suitable contactor and the selection may be dictated by variables such as available space, liquid flowrate, gas flowrate etc.

After the second mixer the two-phase mixture is coarsely separated, the loaded amine being passed to the regeneration unit 11 via stream 54 and the treated gas being passed to the existing column 1 via stream 5a. The separation in contactor unit 50 is such that less than 1% of the liquid is entrained with the separated gas and negligible gas is entrained with the separated liquid.

Treatment in the contactor unit 50 increases the loading on the amine before it is passed to the regeneration unit 11 and also reduces the acid gas content of the gas feed before it is passed to the counter-current column 1 where it is treated with lean amine. The new feed to the conventional column 1 may now have an acid gas content of, for example, just 1% compared with 2.5% in a typical sour gas feed. This means that the lean amine is used to reduce the acid gas content from a lower staring concentration and is therefore focussed on the more difficult removal. The increased loading of the amine before it is passed to the regeneration unit 11 means that more of the capacity of the amine is used and that therefore flowrates in the regeneration unit are reduced and the supply of fresh solvent to the system as a whole are significantly reduced by, for example, 30-50%.

The amine feed from the LPG treatment unit has some hydrocarbons entrained in it. If passed on to the downstream units, once the sour gas has been separated from the amine, these hydrocarbons can significantly reduce the efficiency of the units e.g. by de-activating catalysts, blocking the reactors. In addition, they increase the load on the system in the downstream plants, e.g. the de-sulphurising Claus plant. The contactor unit 50 therefore also has the function of flashing off most or all of the entrained hydrocarbons from the liquid amine stream into the gas stream. This gas stream may subsequently be passed to a conventional counter-current column where the hydrocarbons will pass with the treated gas to the gas outlet 7. Therefore, when the used amine stream is passed to the regeneration unit 11, there is little or no entrained hydrocarbon to pass to the downstream units. The contactor unit preferably decreases the hydrocarbon content in the amine stream by at least 80%, more preferably at least 90% and most preferably at least 95%.

As the LGP treatment unit 20 operates at a higher pressure than the acid gas absorption column 1 and contactor unit 50, there will be no need for additional pumping and the amine flow from the unit 20 to the additional contactor unit 50 can be controlled by the use of remotely operated valves (not shown).

Figure 3A:
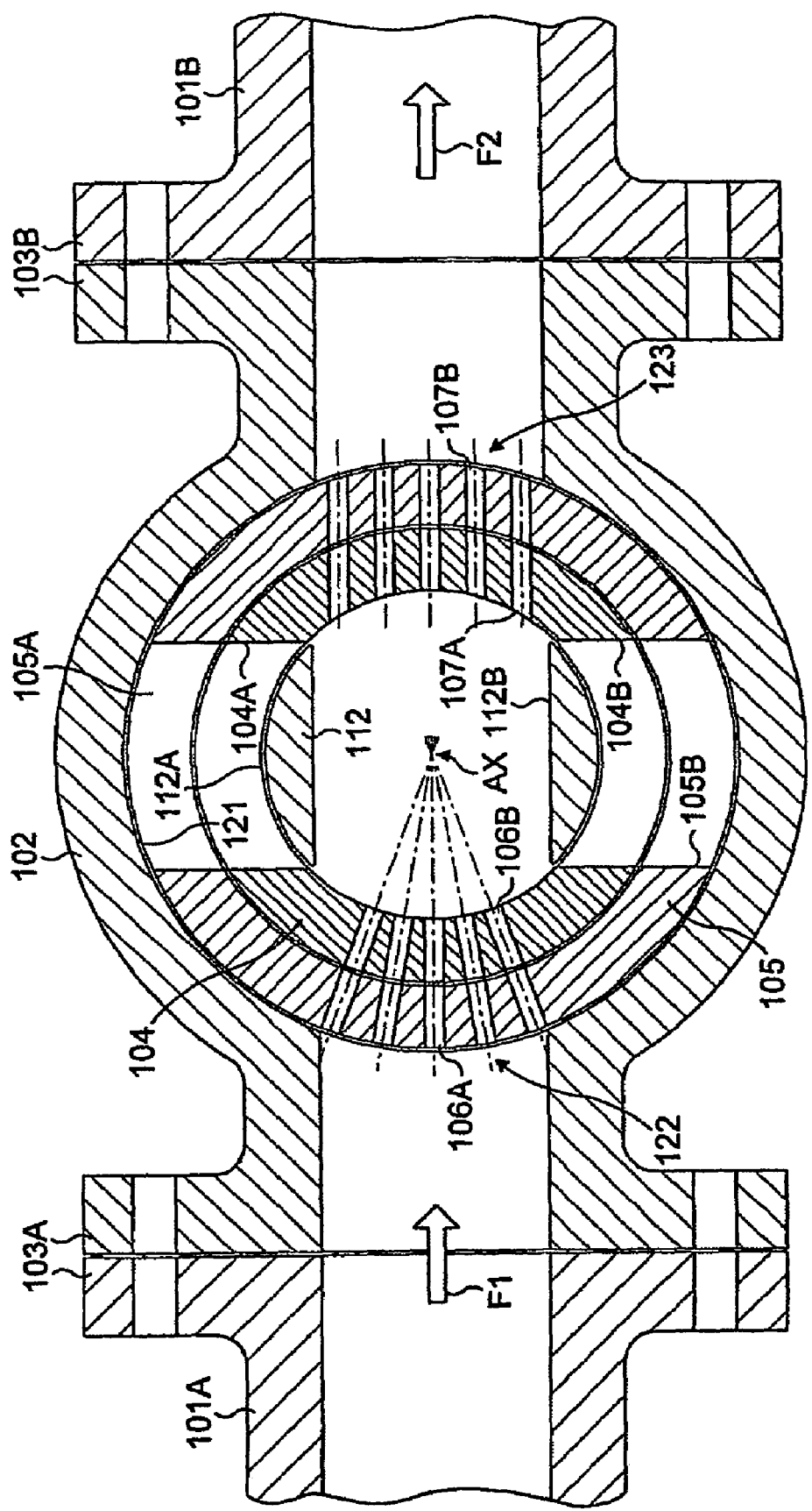
FIG. 3 a shows a mixer used as the second mixer and optionally also used as the first mixer in the method of the present invention, the view being an axial longitudinal section normal to a common axis of rotation in the mixer.
FIG. 3b shows the mixer of FIG. 3a in axial longitudinal section but coincident with the axis of rotation.
FIG. 3c shows a cross section of the mixer of FIG. 3a through the common axis of rotation.
Figure 3B:
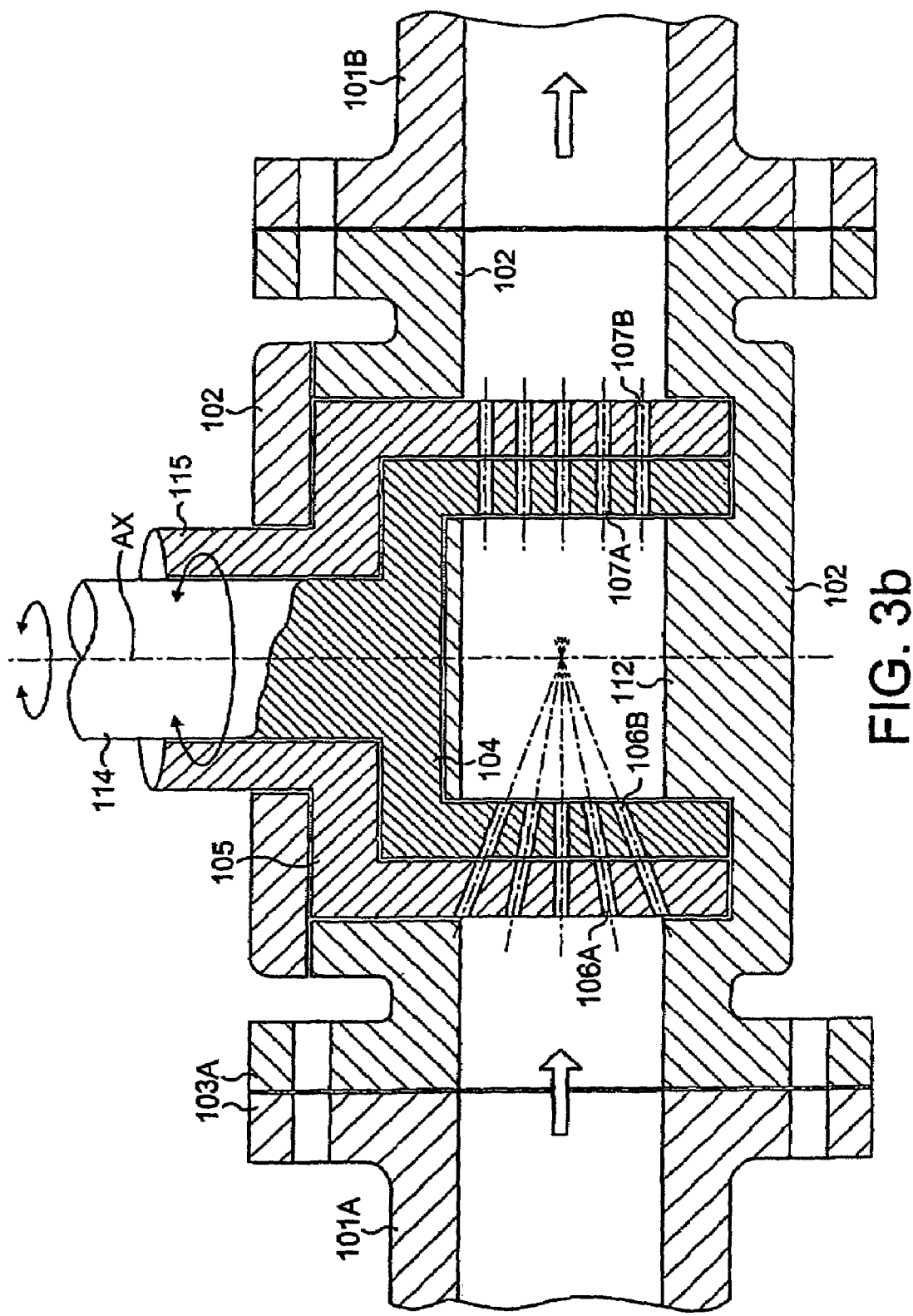
Figure 3C:
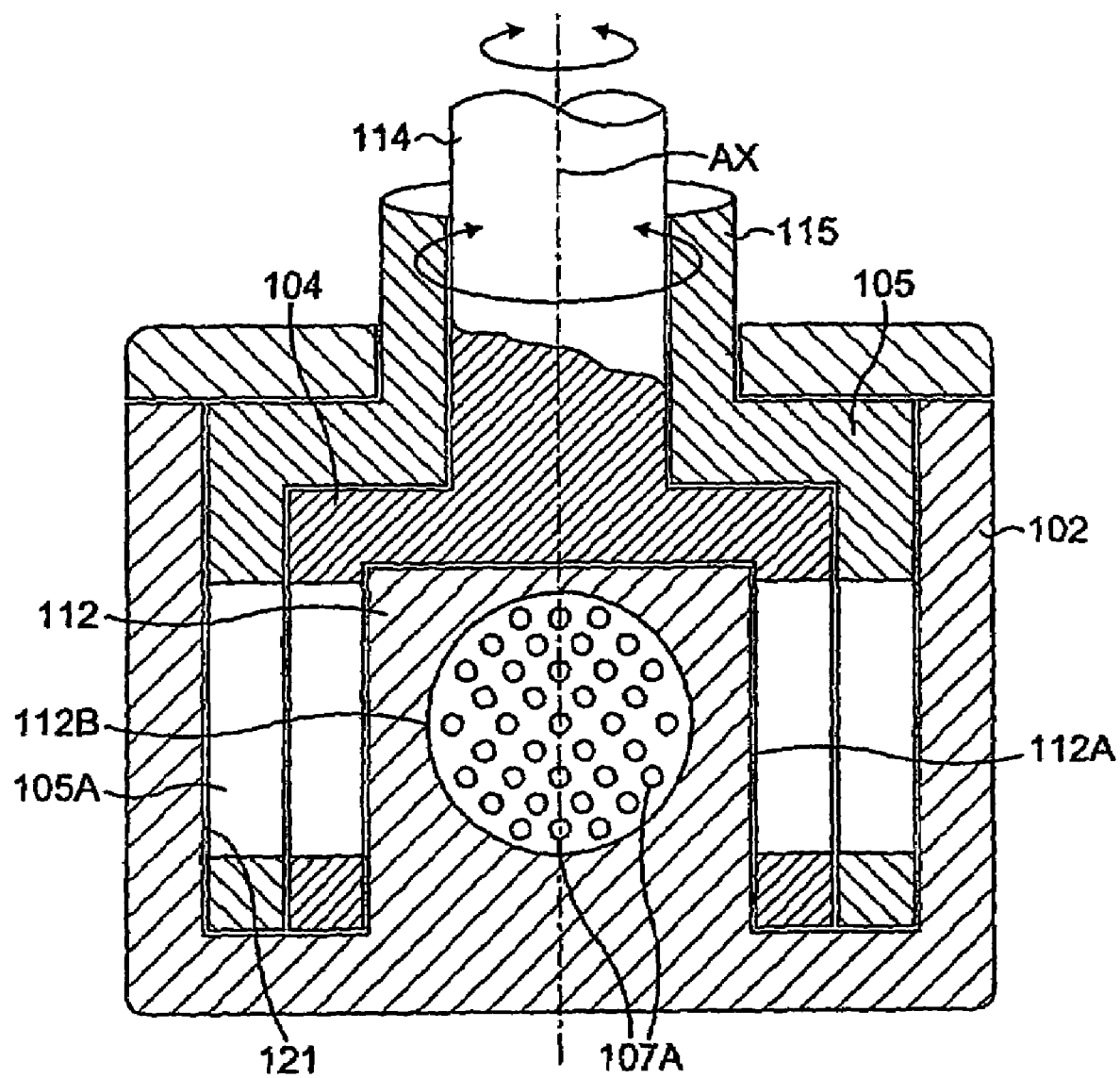

As indicated above the contactor unit 50 for de-bottlenecking an existing process or for selectively removing one or more acid gas components from a gas stream and simultaneously flashing off hydrocarbons consists of two contactors or mixers, the second of which is that shown in FIGS. 3a to 3c. The first contactor or mixer may be any of those shown in FIGS. 3, 4 and 5 (including a second mixer of the type shown in FIG. 3) although any other suitable turbulent contactors may also be used. If increased gas flow capacity is required, one or more contactors may be used either in series or in parallel to the existing column. The small size of the contactors means that they can be installed on existing sites where there would not be room for additional conventional columns.

FIG. 3a shows an inline mixer in which a housing 102 for the mixer is positioned in the pipe 101A, 101B by means of flange connections 103A, 103B. The direction of fluid flow through the pipe is indicated by the arrows F1 and F2. This mixer can be easily installed in an existing pipeline without the need for the substantial extra room which would be required for additional conventional columns. The housing 102 has an interior wall 121 which is shown as being substantially cylindrical which is broken by an inlet opening 122 and an outlet opening 123. The housing includes two regulating elements 104 and 105 which are co-axial and have a similar (cylindrical) shape as the housing. These elements 104 and 105 are individually rotatable in the housing 102 and each include channels 106A 106B and 107A, 107B in their respective walls. The channels preferably have substantially larger length than lateral dimensions. The common axis AX of housing 102 and the regulating elements 104 and 105 is shown to be oriented at 90° to the general flow direction although this is not essential. In general, the common axis will lie broadly transversely to the direction of flow.

At the upstream side, the input flow channels 106A and 106B have a convergent orientation so that they have a direction generally towards a central region within housing 102. This is an idealised case. On the downstream side, the outgoing flow channels 107A and 107B are largely parallel in a corresponding direction to the through-flow direction. By rotating the regulating elements 104 and 105 from the position shown in the figures, the flow channels through the mixer will be changed. As shown, the channels both upstream and downstream are both aligned with each other and centred with respect to the openings 122 and 123 so that fluid flows through with least resistance. This is the mixer in the fully open position where the channels constitute a continuous and edge-free flow path. Rotating one or both of the regulating elements can vary the size and number of channels and thereby affect the fluid velocity and hence mixing. It will also result in a larger pressure drop due to the higher flow resistance.

The flow channels (e.g. channels 107A) may be of a circular cross-section as shown in FIG. 3c or may have an alternative configuration, such as a narrow or slit-like arrangement, for example. The channels can also be arranged so that they have a conical rather than a cylindrical form which may introduce a nozzle type effect towards the centre of the housing 102. The channels are shown in FIG. 3c to have a regular arrangement across the whole of the opening area 122 and 123. However, in some circumstances it may be preferable to deviate from the regular distribution, in particular at the upstream side of the mixer. To increase the capacity of the channels i.e. to reduce the resistance to flow through the mixer, the housing 102 can be designed with an expanded flow cross section towards one or both opening 102 and 103 with corresponding increases in the wall area of the perforated portions.

Referring to FIGS. 3b and 3c it can be seen that the regulating elements 104 and 105 have coaxial spindles 114 and 115 respectively the control the mutual movement of the elements with respect to each other and the housing. Adjustment of the relative positions of the regulating elements will control the flow through the mixer. At one extreme the passage through the flow channels will be completely closed.

In addition to the channels mentioned above, the regulating elements 104 and 105 have bores 104A, 104B and 105A and 105B respectively of a diameter corresponding to the pipe diameter and the openings 122 and 123. These bores have an axis lying generally at 90° to the central axis of the respective wall portions with the flow channels. These bores 104A, 104B, 105A and 105B can be aligned with the openings 122 and 123 to give a substantially free and straight pipe section. Plug-like core member 112 can be adapted to sealingly co-operate with the internal side of regulating element 104 at the outer wall 11 2A of the core member. Through the core member 112 there is a bore 112B which preferably lies aligned with and is provided with the same flow cross-section as the inlet opening 122 and the outlet opening 123.

The convergent arrangement of the channels towards the central point of the housing 102 gives good mixing for a range of flow patterns. Any liquid components which are located at the bottom of the flow in pipe section 101A will be lifted by the inclined channels into the centre of housing 102. Similarly, any gases which are located in the upper section of the pipe in the inlet section are urged downwardly towards the central region. The phases therefore mix effectively in the centre of the housing 102 and are then fed out in a uniform way through the parallel outgoing flow channels 107A and 107B. There is therefore a fully homogenised mixture of the phases across the cross section of the pipe section 101B.

Figure 4A:
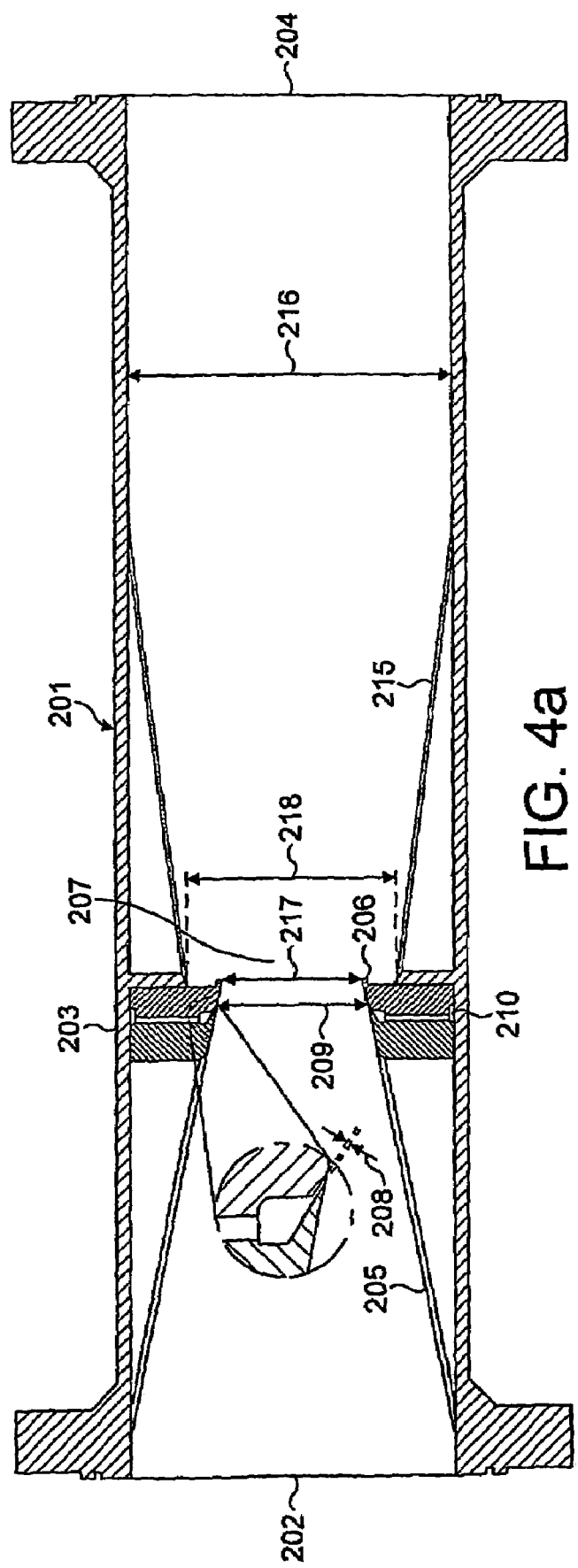
FIG. 4a is a view of a turbulent contactor suitable for use as a first mixer in the method of the present invention.

FIG. 4a shows a first embodiment of a contactor which may be the first of the series mixers in contactor unit 50. The contactor 201 comprises a gas stream inlet 202, a liquid stream inlet 203 and an outlet 204. The gas stream is supplied to the gas stream inlet which leads to a converging pipe section 205. The converging pipe section 205 accelerates the gas stream as it passes the liquid stream inlet 203 to the end of the pipe section 205 where there is a sharp edge 206. Downstream of this sharp edge 206 there is a reaction zone 207 where the gas and liquid are preferably formed into a homogeneous mixture.

The liquid is supplied to the liquid stream inlet 203 from where it is fed in a controlled manner to the inside of the converging pipe section 205. The liquid is presented to the pipe in the form of an annulus around the inner surface of the pipe. The initial phase velocity of the liquid exposed to the gas stream is governed by the liquid flowrate, the gap distance 208 and the annulus distance 209. The gap distance 208 may be varied by movement of the blocks 210. The gap will be varied to take into account the liquid solvent being used, the properties of which vary considerably. The liquid annulus diameter 209 may be varied by changing the angle of the converging pipe or by moving the position of the liquid annulus relative to the end of the converging pipe.

Figure 4B:
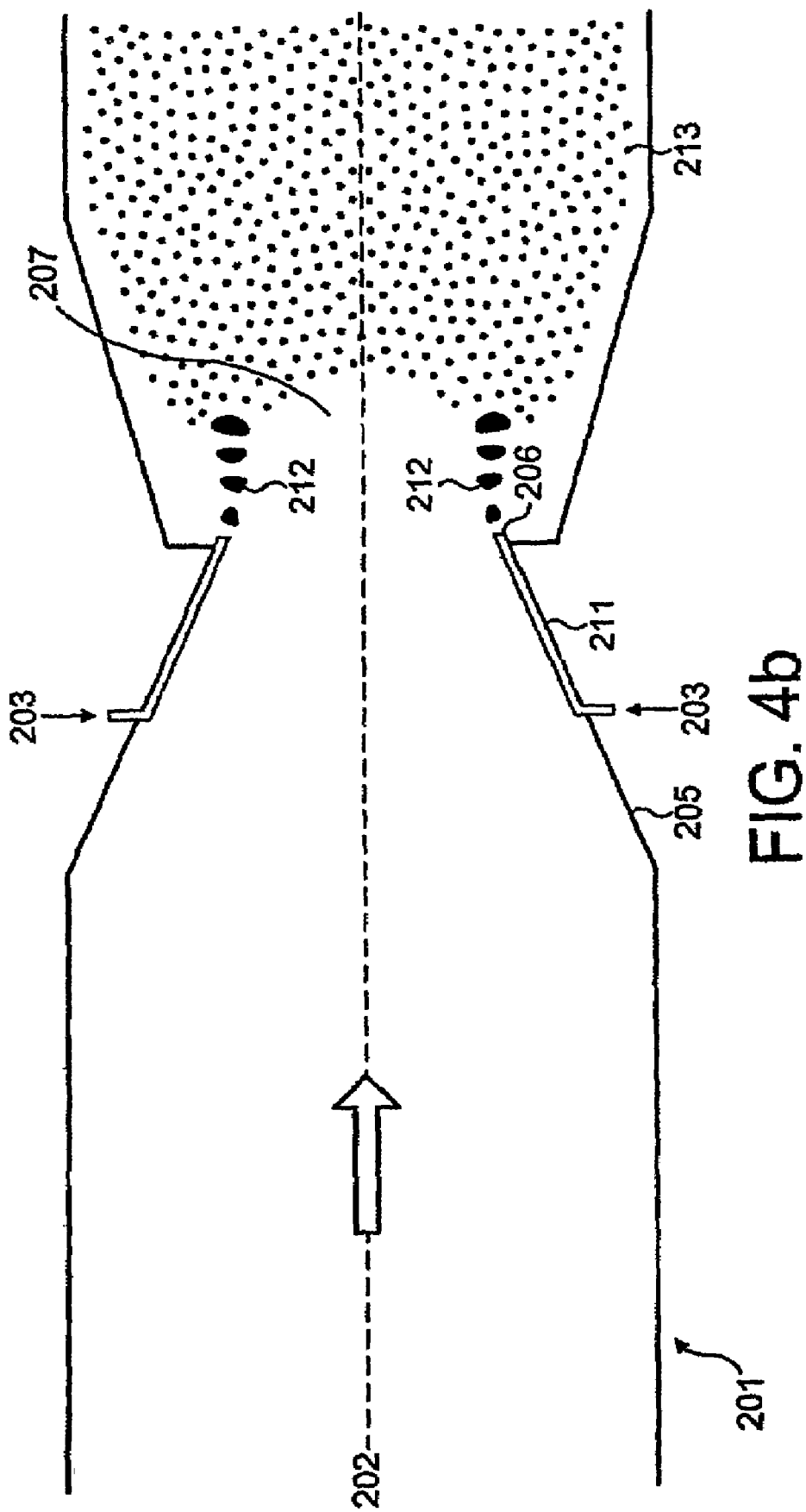

The liquid annulus presented to the inner surface of the pipe is drawn along the inner surface of the pipe in the form of a film 211 by the gas stream. This is best seen in FIG. 4b. The liquid film 211 closely adheres to the side of the pipe section 205 until the sharp edge 206 is reached. At this point, the liquid form breaks up to form filaments 212. The generation of the filaments, and their subsequent velocity vector, is determined by the relative velocity between the gas and the liquid phases, the gas-liquid surface tension and the sharp edge 206. Due to the extremely turbulent conditions in the reaction zone 207, the filaments 212 are further broken up into very small droplets 213 which provide a very high surface area to volume ration thereby making extremely efficient use of the liquid provided. If appropriate, this allows the use of considerably smaller volumes of liquid than are required by the conventional prior art processes while still achieving similar acid gas absorption. The formation of droplets in the reaction zone is favoured by a high Weber (We) number and consequently by a high gas flow-rate.

The small liquid droplets and the gas stream are intimately mixed in the reaction zone 207 and the multiphase stream passes on through a conical difibser 215 (see FIG. 4a) where some of the pressure dropped in accelerating the gas stream in the converging pipe section 205 is recovered. The multiphase stream then passes on to the second contactor (as shown in FIGS. 3a, 3b and 3c) without separation into separate phases.

Figure 4C:
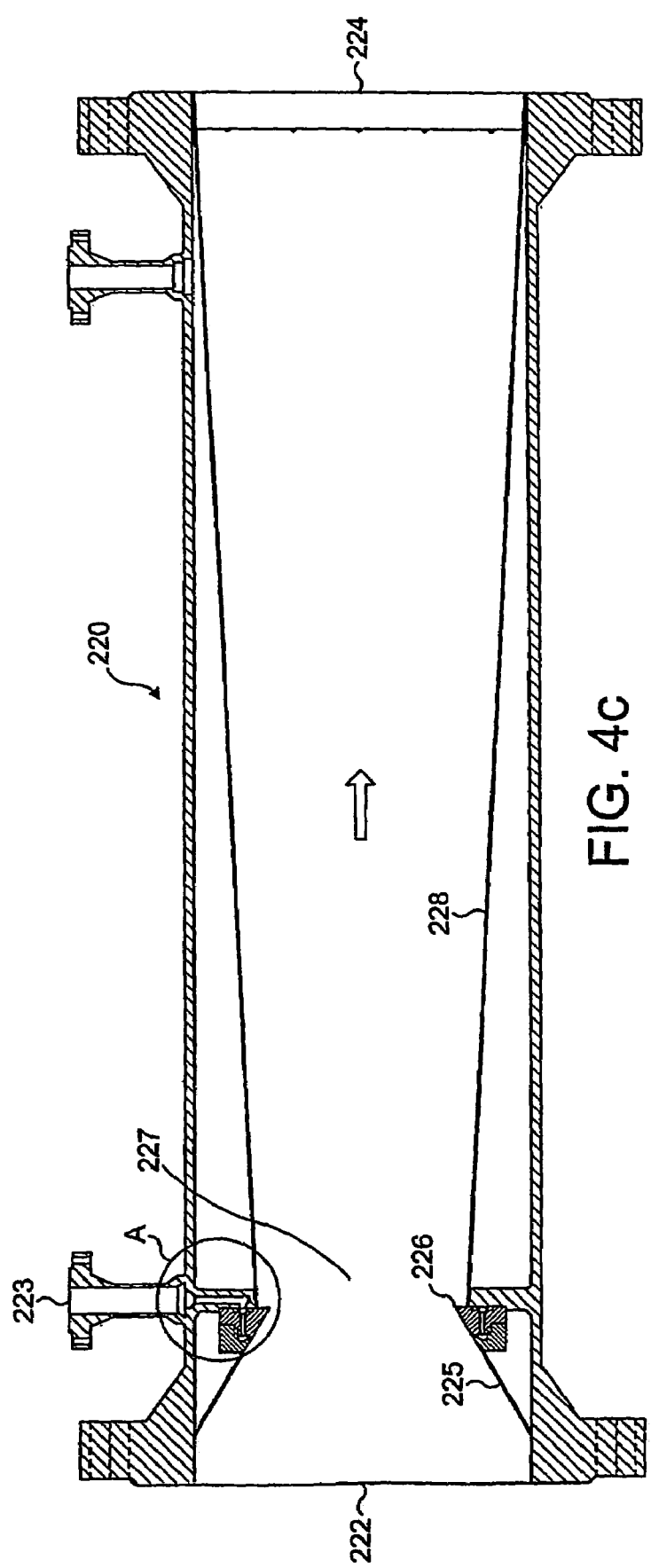
FIG. 4c is a view of a second embodiment of a turbulent contactor similar to that of FIG. 4a suitable for use in the method of the present invention.

FIG. 4c shows a second embodiment of a contactor suitable for use in the method of the present invention as the first mixer in contactor unit 50. Contactor 220 comprises a gas stream inlet 222, a liquid stream inlet 223 and an outlet 224. The gas stream is supplied to the gas stream inlet which leads to a converging pipe section 225 for accelerating the gas stream. At the end of the converging pipe section there is a sharp edge 226 downstream of which there is a reaction zone 227 where the gas and liquid are preferably formed into a homogeneous mixture. One difference between the contactor of FIG. 4a and that of FIG. 4c is the relative location of the liquid inlet to the annulus of liquid. In this case, the liquid is supplied to the inlet 223 from where it passes through the passages 223a and 223b to a reservoir 223c which passes round the circumference of the pipe. The liquid then passes out through the channel 223d which again passes round the whole circumference of the pipe (see FIG. 4d) to an annulus on the inner surface of the converging pipe section Because of the shear stress conditions and dynamic pressure exerted by the gas to the liquid, the liquid stream still adheres to the surface of the pipe until the sharp edge 226 is reached.

Another difference between the two contactors is in the slope of the converging pipe sections 205, 225. In contactor 220 the converging pipe section 225 has a considerably steeper slope than that of contactor 201 and therefore reaches a smaller cross sectional area in the same length of pipe. The diameter ratio between the throat and the pipe as well as the angle of the converging cone can be varied independently. This reduced cross sectional area will result in a greater acceleration of the gas stream as it approaches the sharp edge but will also result in a consequently larger pressure drop. Also the selection of the angle of the converging pipe will be affected by the permanent pressure drop which can be accommodated over this apparatus. As indicated previously, the break up of the liquid into filaments and subsequently into droplets is controlled by the Weber number. This is dominated by the square of the relative velocity between the gas and the liquid phases. Therefore a small change in the velocity of the gas stream, controlled in part by the acceleration generated by the angle of the converging pipe section, may have a significant effect on the break up of the liquid and hence the efficiency of the system.

Figure 4D:
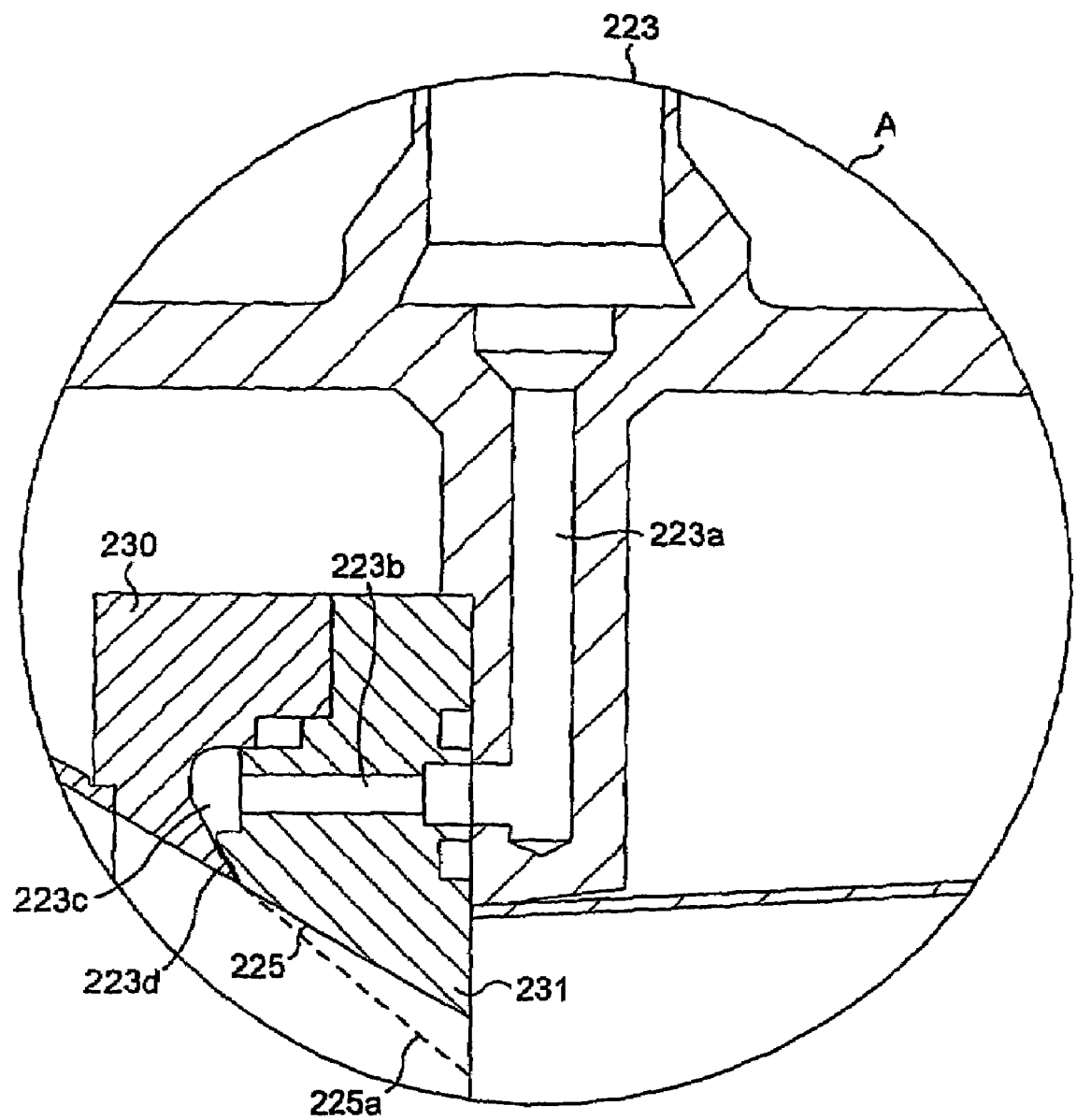
FIG. 4d is an enlarged view of the liquid stream inlet portion of the contactor shown in FIG. 4c ringed in circle A.

FIG. 4d shows an enlarged cross section of the area within the circle A of FIG. 4c. This shows in greater detail the passage of the liquid through the liquid stream inlet 223. The liquid passes through passages 223a and 223b to a chamber 223c which passes round the circumference of the pipe. The liquid is then fed via the narrow passage 223d to the inner surface of the conical pipe section 225. The passage 223d is shown to be very narrow and may be of the order of just 0.2 mm wide. The pressure drop across this passage is carefully controlled and adjusted to ensure a homogeneous distribution continuous flow of liquid around the whole pipe circumference at the converging pipe section 225. As indicated above, the size of the passage 223d is controlled by movement of the blocks 230 and 231. The dotted line 225a indicates an alternative slope for the converging pipe section 225, which gives a higher gas phase velocity and hence enhanced mixing, but will increase the permanent pressure drop across the apparatus. This change may be effected simply by the replacement of one part of the apparatus by another.

After the gas and liquid have been intimately mixed in the reaction zone 227 just downstream of the sharp edge 226, there may be a diverging section 228 to recover some of the pressure drop. The length of section 228 may be varied to control the degree of pressure recovery. Following the diverging section 228 there is optionally a considerable length of straight pipe to maintain the flow pattern generated and to allow further reaction to take place (see FIG. 4c). The length of the straight pipe is recommended to be of the order of 15 to 20 standard pipe diameters.

Typical dimensions of the contactors may be in the range of 51-1016 mm (2-40 inches) in diameter. In particular, the apparatus for scavenging of natural gas may have a pipe diameter 216 (see FIG. 4a) of 610 mm (24 inches) with a sharp edge diameter 217 of 253 mm (10 inches). The initial diameter 218 of the diverging pipe may be 370 mm (14.5 inches). As stated above, the sharp edge diameter may be varied along with the slope of the converging pipe and other sharp edge diameters which may be used include 296 mm (11.7 inches) similar to that shown in FIG. 4c and 272 mm (10.7 inches).

Figure 5A:
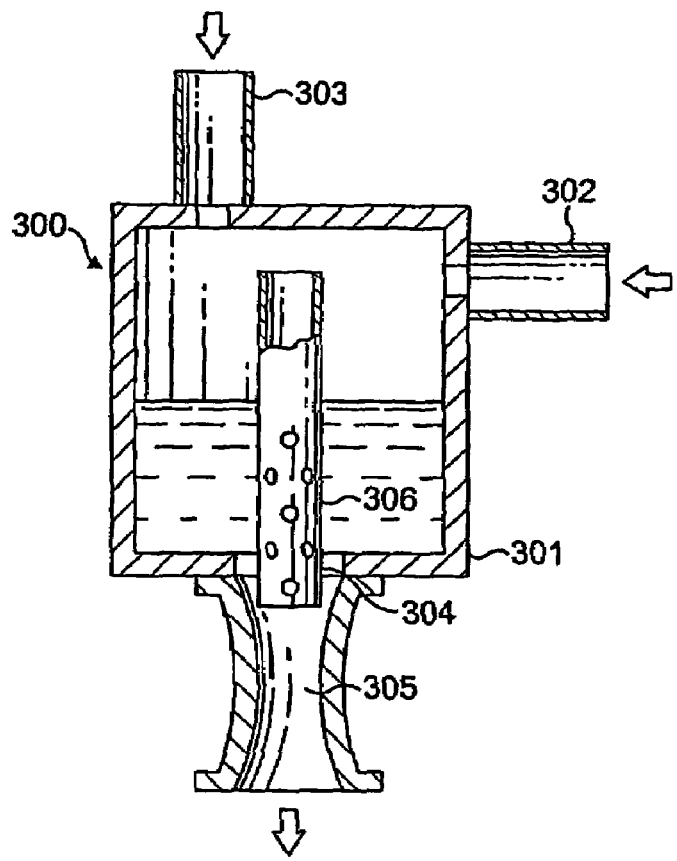
FIG. 5a is a view of another contactor suitable for use as a first mixer in the method of the present invention.

An example of another contactor which may be used as the first of the series mixers in contactor unit 50 is shown in FIG. 5a. The turbulent contactor 300 comprises a vessel 301 having a first fluid inlet 302, a second fluid inlet 303 and an outlet 304 leading to a venturi passage 305. There is a tube 306 (which may or may not be perforated) extending from the outlet 304 back into the vessel 301. The tube 306 may be connected directly to the fluid inlet 303.

In a first arrangement, the gas mixture is supplied to the vessel 301 and the liquid is supplied to the tube 306 optionally directly whereby the gas is drawn into the venturi by the liquid and the two phases are mixed.

In a second arrangement, the liquid is supplied to the vessel 301 and the gas mixture is supplied to the tube 306 optionally directly whereby the liquid is drawn into the venturi by the gas and the two phases are mixed.

In a third arrangement, the liquid and the gas mixture are supplied to the vessel 301, the liquid being supplied to a level above the level of the outlet 304, whereby the gas is forced out through the outlet 304 via the tube 306, thereby drawing the liquid into the venturi so that the two phases are mixed.

Figure 5B:
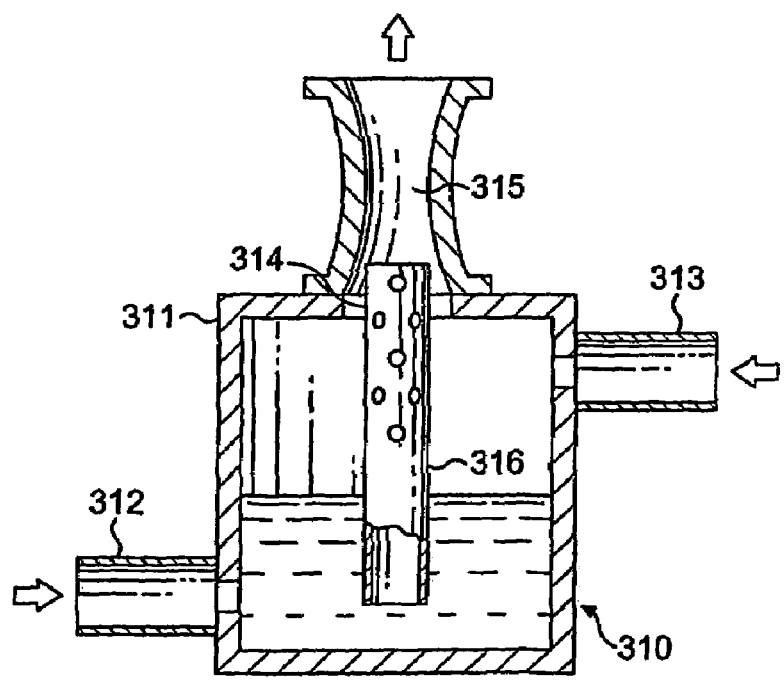

A fourth variant is shown in FIG. 5b. This embodiment is similar to that shown in FIG. 5a, but the contactor 310 is inverted. It comprises a vessel 311 with a liquid inlet 312, a gas inlet 313 and an outlet 314 leading to a venturi passage 315. There is a tube 316 (which may or may not be perforated) extending from the outlet 314 back into the vessel 311. The tube 316 may be connected directly to the gas inlet 313. In this embodiment the liquid is forced up the tube 316 and the gas is drawn into the venturi passage 315 by the liquid and the two phases are mixed. When the tube 316 is perforated, the gas may be drawn into the tube 316 through the perforations.

Figure 5C:
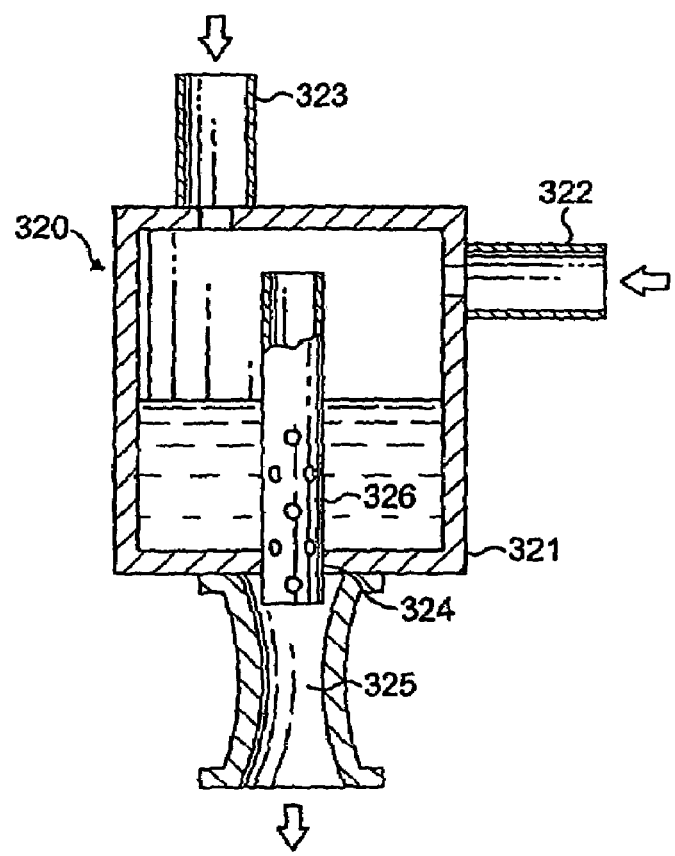
FIG. 5c is a view of a contactor similar to that shown in FIG. 5a but with the perforated tube arranged so that all the fluid which passes through the outlet does so by way of the tube.

A further example of a contactor which may be used as the first mixer in the method of the present invention is that shown in FIG. 5c. The turbulent contactor 320 comprises a vessel 321 having a first fluid inlet 322, a second fluid inlet 323 and an outlet 324 leading to a venturi passage 325. There is a perforated tube 326 extending from the outlet 324 back into the vessel 321. The perforated tube 326 is arranged such that there is no gap at the outlet 324 of the vessel 321 for the fluids to pass through. The result of this arrangement is that all the fluid exits the vessel 321 via the perforated tube 326. The tube 326 may be connected directly to the fluid inlet 323.

In a first arrangement, the gas mixture is supplied to the vessel 321 and the liquid is supplied to the tube 326 optionally directly whereby the gas is drawn into the venturi by the liquid and the two phases are mixed.

In a second arrangement, the liquid is supplied to the vessel 321 and the gas mixture is supplied to the tube 326 optionally directly whereby the liquid is drawn into the venturi by the gas and the two phases are mixed.

In a third arrangement, the liquid and the gas mixture are supplied to the vessel 321, the liquid being supplied to a level above the level of the outlet 324, whereby the gas is forced out through the outlet 324 via the tube 326, thereby drawing the liquid into the venturi so that the two phases are mixed.

Figure 5D:
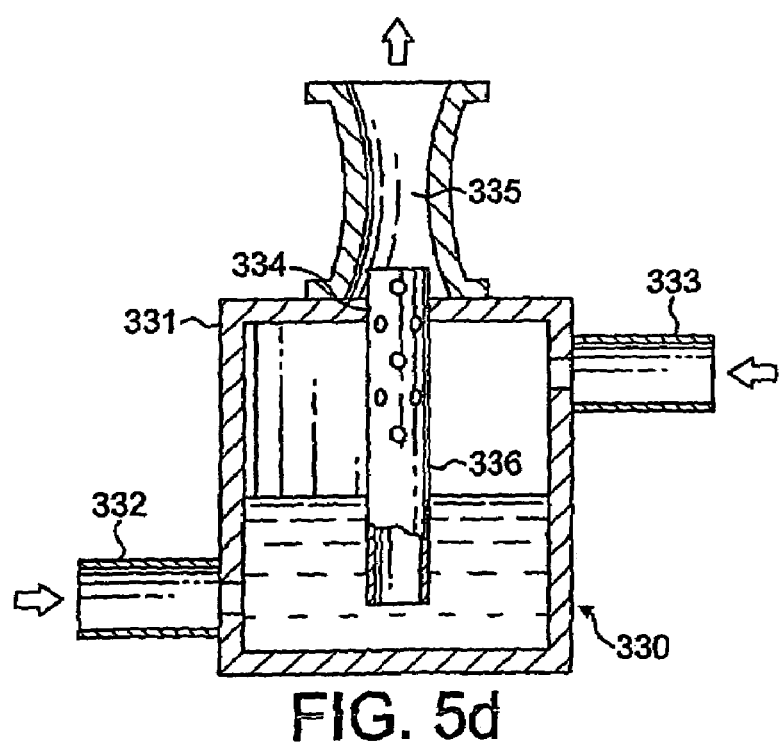
FIG. 5d is a variant of the contactor shown in FIG. 5c.

A fourth variant is shown in FIG. 5d. This embodiment is similar to that shown in FIG. 5c, but the contactor 330 is inverted. It comprises a vessel 331 with a liquid inlet 332, a gas inlet 333 and an outlet 334 leading to a venturi passage 335. There is a perforated tube 336 extending from the outlet 334 back into the vessel 331. As for the embodiment shown in FIG. 5c, the perforated tube 336 is arranged such that there is no gap at the outlet 334 of the vessel 331 for the gas mixture to pass through. All the fluids must pass through the perforated tube 336 to the venturi passage 335.

In this embodiment the liquid is forced up the tube 336 and the gas is drawn into the venturi passage 335 by the liquid and the two phases are mixed. Since the tube 336 is perforated, the gas is drawn into the tube 336 through the perforations.

As indicated above, it is difficult to retrofit multiple feeds to existing columns and in many instances there is insufficient room to add additional columns. By introducing the co-current contactor unit 50 it is possible to pre-treat the absorber gas feed using semi-lean amine from a variety of sources. Therefore the gas feed stream (e.g. natural gas) is pre-treated in the co-current contactor unit 50 with an integrated amine stream. This means that the gas entering the existing counter-current column 1 has a significantly reduced acid gas content which is then treated with lean amine, The extra loading of the amine by the recycle means that the amount of lean amine required is reduced by up to 50% and hence the liquid circulation around the system is reduced.

As indicated above, the contactors of the present invention have the significant advantage of selectively removing $H_2S$ from a gas stream and simultaneously flashing entrained hydrocarbon liquids from the solvent. This is particularly useful in situations where $H_2S$ is being removed from liquefied petroleum gas (LPG) such as in extractors. Using conventional columns, hydrocarbons are entrained with the liquid solvent, reduce the efficiency of the amines and the degree of absorption of the $H_2S$ decreases accordingly. Also, LPG flashed in the regenerator occupies capacity of downstream processing facilities such as Claus plants (sulphur conversion units). By using the method of the present invention and feeding it with the solvent from the extractor, i.e. introducing additional co-current contactors before existing columns, a large percentage of the $H_2S$ can be removed before the conventional column and hydrocarbons entrained are largely removed. The efficiency of the conventional column therefore increases and the amine circulation rate in the column decreases thereby reducing the duty on the system as a whole.

The amine molecules used in these systems reveal both polar and non-polar sites, therefore the molecules will interfere with both the liquid hydrocarbon phase and the aqueous phase. For such a hydrocarbon-amine mixture the prediction of the LPG flashing performance is not possible without experimental data obtained with the fluids in concern.

The liquid C3+ components in the amine from the LPG-train are not in equilibrium with the C3+ components in the feed gas to be treated. The main components of the gas are C1, C2 and $H_2$, and the feed gas is initially low in C3+ components.

As the contactor unit 50 according to the present invention is characterised by a very high gas-liquid interfacial area (per unit length) and corresponding high mass-transfer rates, it is expected that a multiphase system should approach equilibrium far faster than in a comparable flash vessel. One reason for this is the high driving force exerted to LPG-liquid exposed to the gas phase. Another reason is the volume of the LPG-liquid being exposed to the gas phase through the continuous redistribution of the LPG-liquid dispersed in the amine. The exposure and redistribution is enhanced by the high liquid entrainment and deposition rates associated with the gas-droplet flow and gas-liquid mixing in the contactor unit 50. As a result, the amounts of liquid hydrocarbons are significantly reduced towards the end of the contactor unit 50.

In a flash vessel it is thought that the following assumptions apply:
(i) light hydrocarbons (C1, C2) and hydrogen are absorbed or entrained as gas, and will easily be separated from the amine in the flash vessel due to the shift in equilibrium conditions (e.g. pressure) and the favourable conditions for gravitational separation of the gas bubbles in the liquid;
(ii) liquid C3+ must be exposed to an atmosphere with sufficiently low C3+ partial pressure in order to flash. This process is slow, and the mass transfer depends on gas-liquid interfacial area and the residence time. Thus the C3+ flash rate in the vessel is assumed to be low.

In summary, the C3+ mass flux with the amine is a function of the initial C3+ flux with the amine (prior to the exposure to gas contacting); the gas-liquid interfacial area and residence time in the contactor unit; and the C3+ gas concentration in the gas mixture The contactor unit of the present invention will contribute to significantly reduced C3+ flux into the flash vessel. Also, amine stream integration will reduce the circulation rate and hence increase residence time in the flash vessel.

Figure 6:
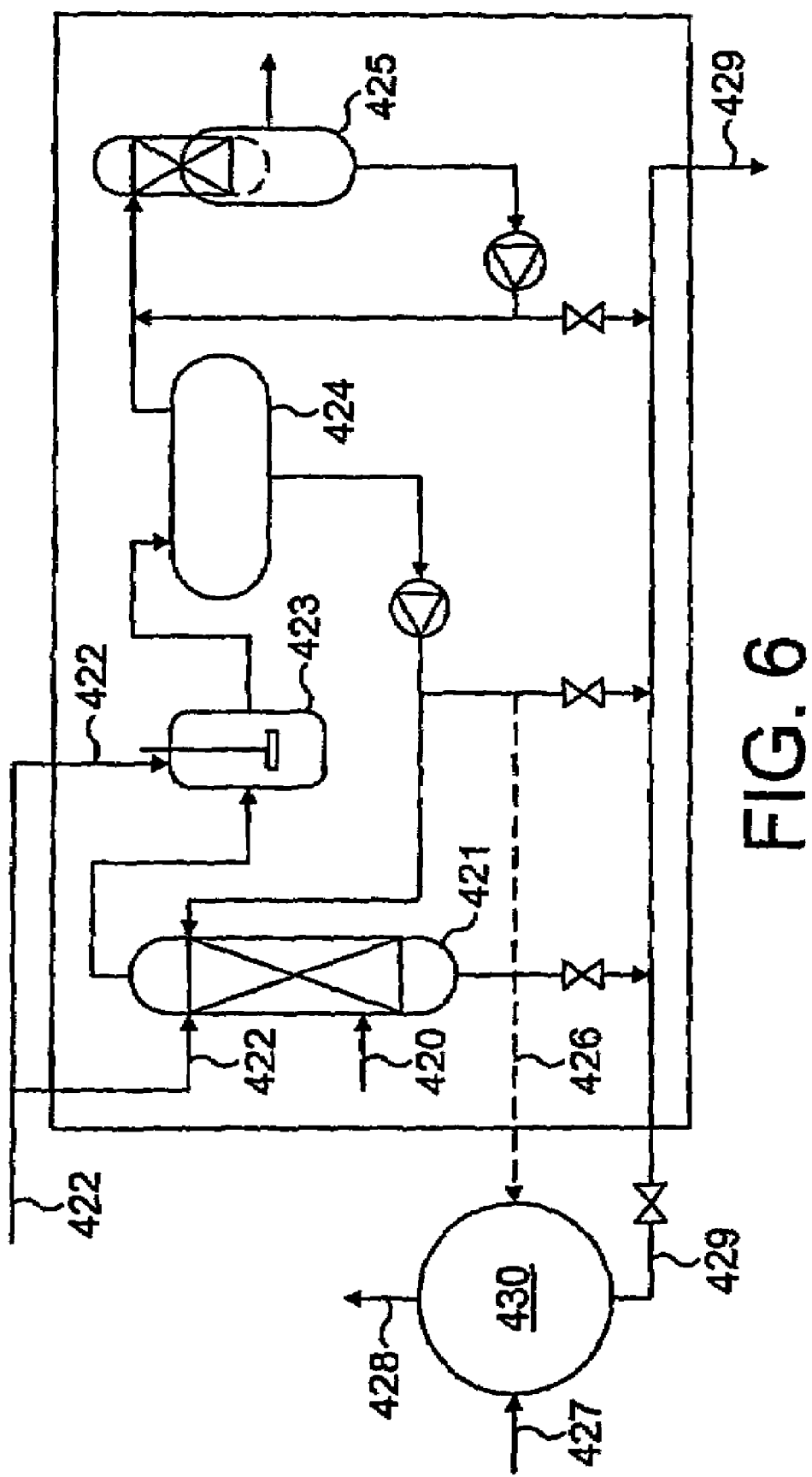
FIG. 6 shows the set-up used to measure the simultaneous performance of the contactor unit on removal of LPG from an amine feed and selective $H_2S$ absorption from an off-gas feed.

FIG. 6 shows apparatus used to test the simultaneous performance of the contactor unit of the present invention for removal of LPG from the amine feed by flashing during the gas-liquid exposure process, and selective $H_2S$ removal from the refinery off-gas using the semi-lean amine from the LPG extractor. LPG is fed via stream 420 into an LPG extractor 421 together with lean amine via stream 422. The tops product is passed on to a further mixer 423 where additional lean amine is added. The multi-phase fluid passes on to a settler 424, from where semi-lean amine may be fed back to the LPG extractor 421. The gaseous product passes from the settler to a coalescer 425 from which more semi-lean amine is extracted. A significant portion of this semi-lean amine acts as the feed to the contactor unit 430 via stream 426. In the contactor unit 430 the semi-lean amine reacts with the refinery off-gas (stream 427) producing streams of treated gas 428 and loaded amine to pass to the regeneration unit 429.

In order to quantify the amount of LPG removed from the amine stream fed to the contactor, the initial LPG content in the amine stream must be determined. Liquid samples of approximately 0.5 $dm^3$ are therefore withdrawn from the amine stream into an expanding piston cylinder at process conditions. The LPG is flashed from the amine sample into a pre-vacuumed gas bag by means of repeatedly carrying out the sequence: vacuuming, shaking and settling of the sampled liquid until no more gas can be flashed. The volume of the flashed gas collected in the sample bag is measured, and the composition of the gas mixture is determined using gas chromatography.

Figure 7:
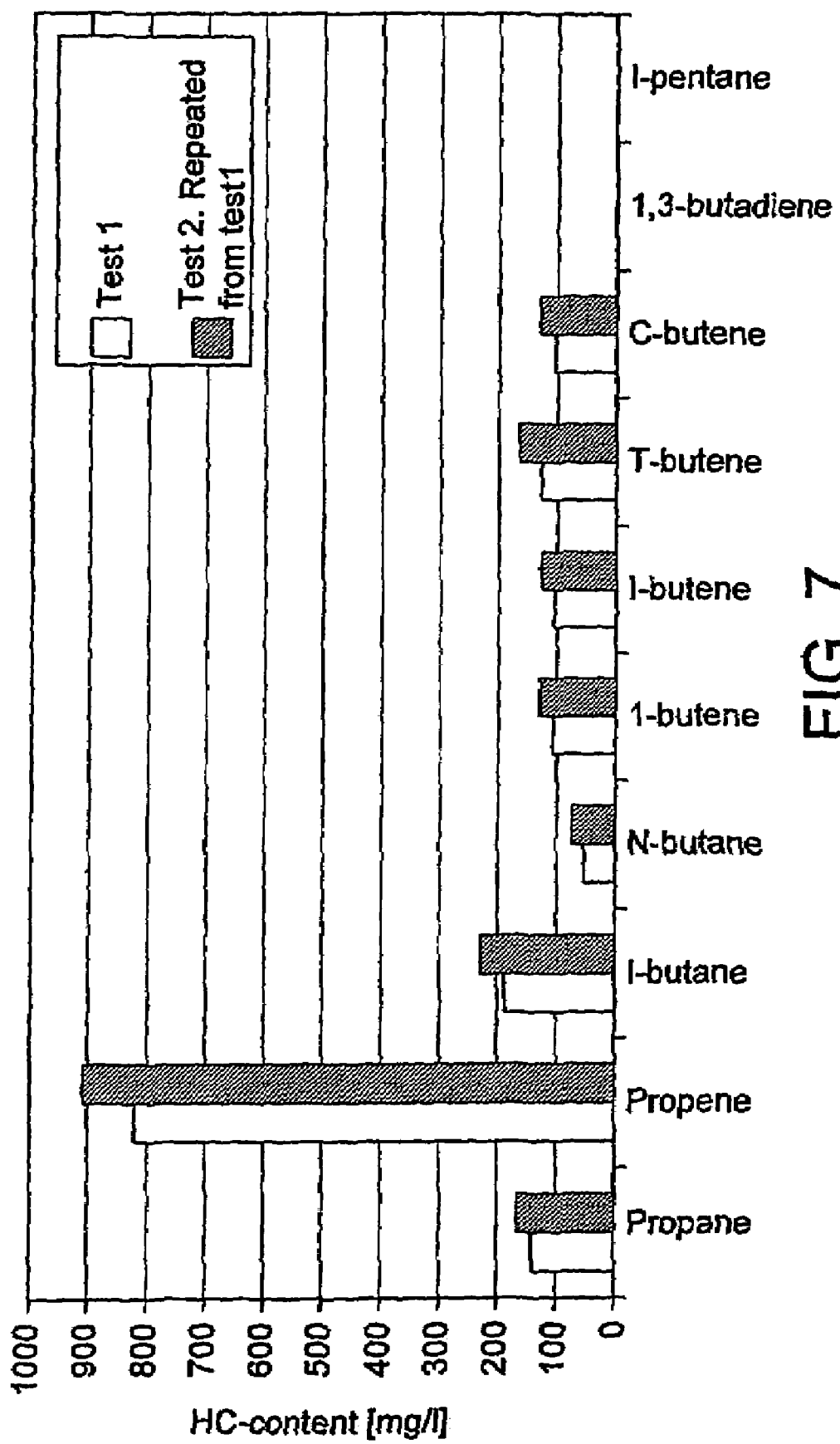
FIG. 7 shows the results of a calibration test of the LPG measurement apparatus.

This analytical method was qualified by making samples of known volumes of purely regenerated amine and mixtures of the regenerated amine and LPG. The method has been further qualified by repetition of the tests. As can be seen from the results shown in FIG. 7, the uncertainty in the liquid analysis is of the order of ±10% which is considered to be acceptable. The results of some of the tests conducted are given in Table 1 below.

TABLE 1

| Sour gas concentrations (vol %) | | | | Sour gas removed (%) | | HC removed from |
|---|---|---|---|---|---|---|
| $H_2S$ in | $H_2S$ out | $CO_2$ in | $CO_2$ out | $H_2S$ | $CO_2$ | amine (%) |
| 2.78 | 0.58 | 1.55 | 1.46 | 79 | 6 | 81 |
| 2.72 | 0.61 | 1.61 | 1.49 | 78 | 7 | 90 |

Figure 8:
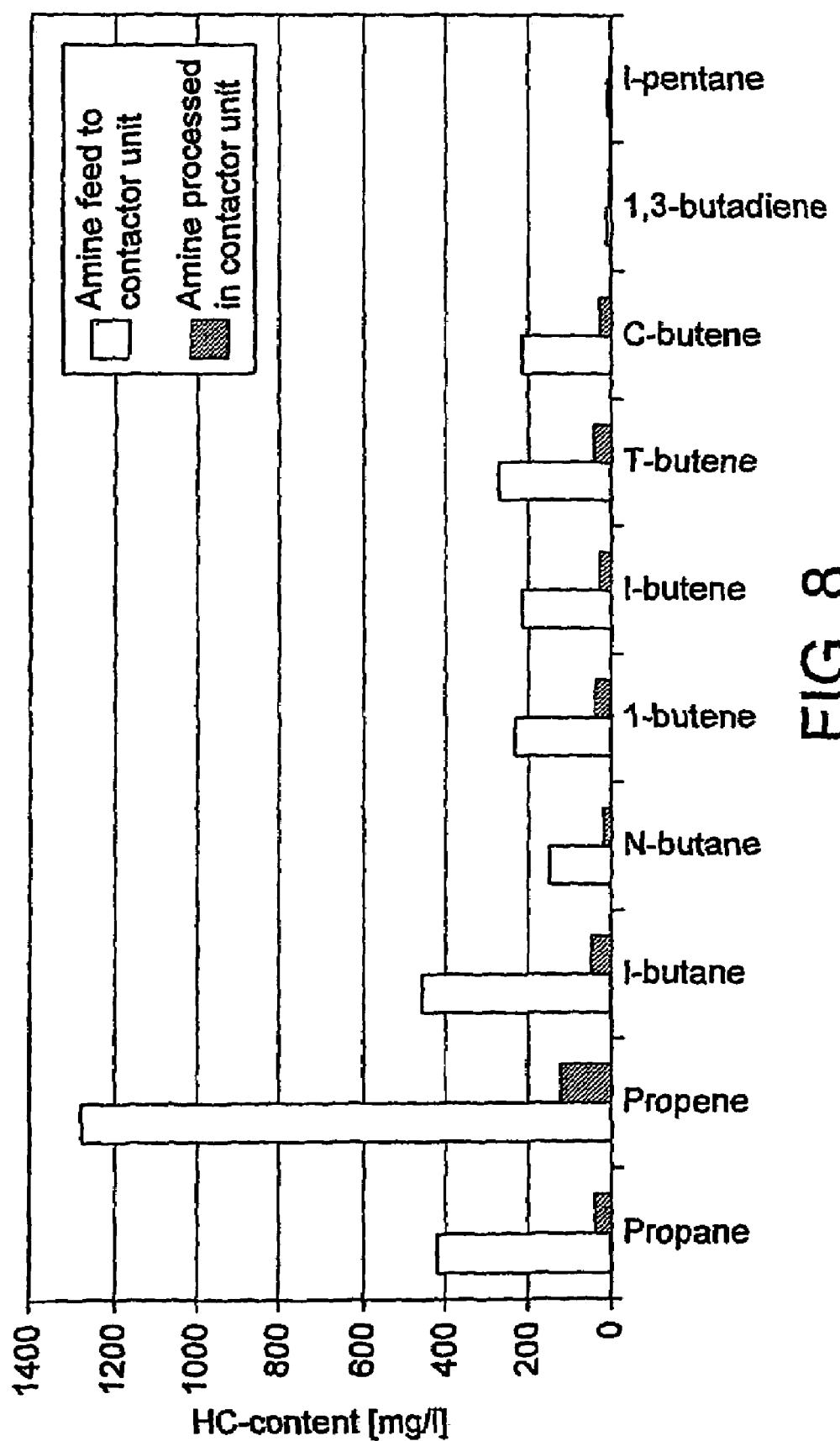
FIG. 8 shows the HC content in the amine stream before and after processing in the contactor unit.
Figure 9:
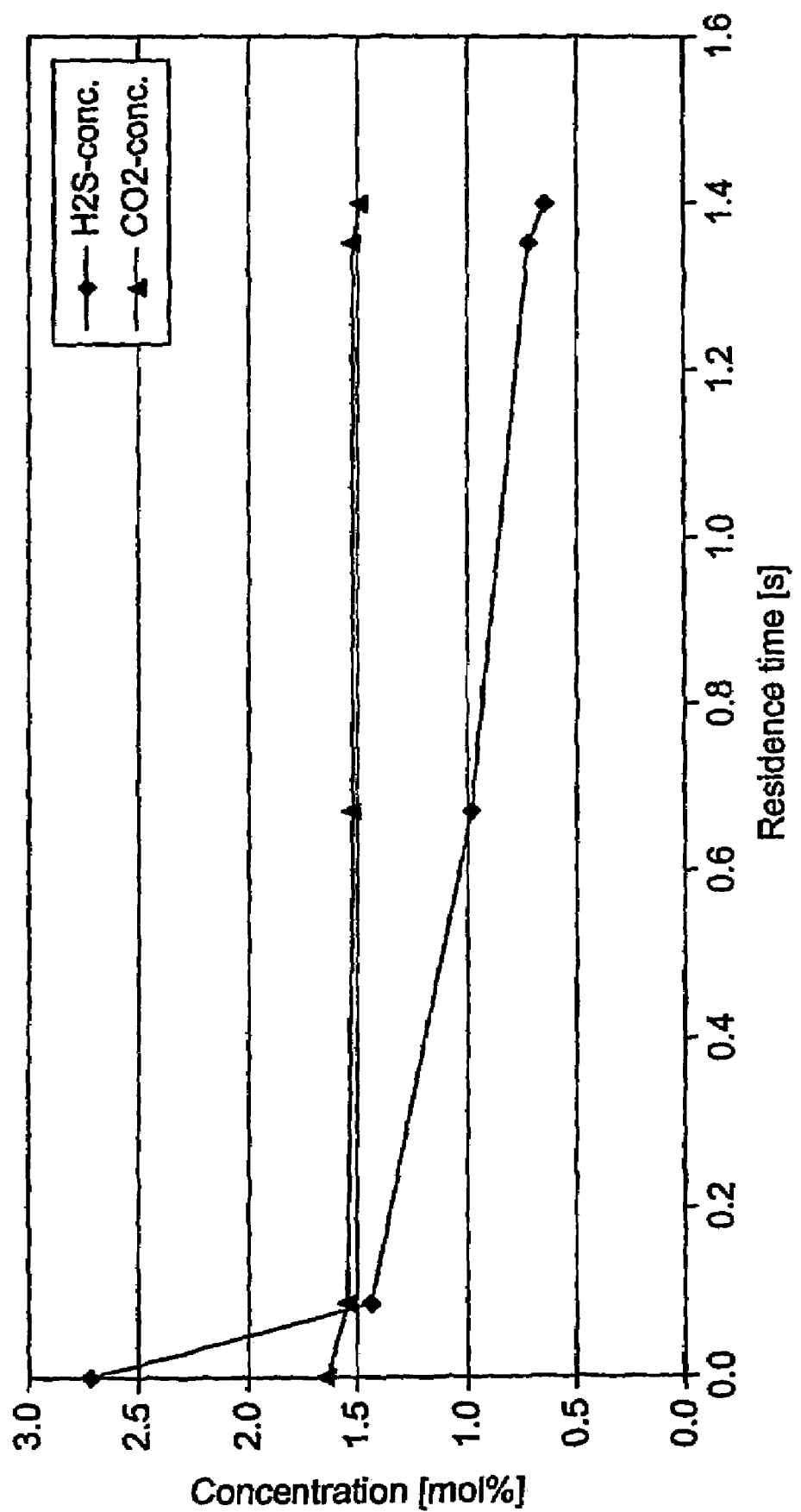
FIG. 9 shows the $H_2S$ and $CO_2$ content of the off-gas feed against time after it has been fed to the contactor unit.

As can be seen from the above results, approximately 90% of the hydrocarbons entrained in the amine and 78% of the $H_2S$ in the sour gas can be removed simultaneously in the contactor unit of the present invention. In addition, the co-absorption of the $CO_2$ is only 7%. The data for the second set of results in table 1 is plotted in FIGS. 8 and 9.

The present invention therefore provides an affective solution to the problem of entrained hydrocarbons in an amine liquid feed and also provides an effective method of selectively absorbing $H_2S$ from a gas stream in preference to $CO_2$ while flashing off most, if not all, entrained hydrocarbons in a recycle integrated amine stream.

The invention claimed is:

1. A method for simultaneously absorbing selected acid gas components from a gas stream and flashing off hydrocarbons entrained in a liquid steam including a solvent or reagent for the selected gas component, in which:
   the gas stream and liquid steam are fed into a first contactor where they are contacted co-currently and subjected to turbulent mixing conditions;
   the multi-phase flow from the first contactor is passed to a second contactor comprising a housing adapted to be inserted into a pipe and to have a fluid flow pass therethrough, said housing comprising an inlet and an outlet opening respectively, the housing being provided with at least one interior moveable sealingly mounted regulating element partially enclosing a central chamber, to provide first wall portions associated with an upstream side of said housing, and second wall portions associated with a downstream side of said housing, said wall portions being provided with a number of through-going flow channels, each having a substantially smaller cross-sectional area than the flow cross-section of the inlet and outlet openings respectively, and in which the regulating element is adapted to be moveable in relation to said housing; and the multi-phase flow from the second contactor is separated into a gas phase and a liquid phase after the second contactor.

2. A method as claimed in claim 1, in which the first contactor is a turbulent contacter having a contacting pipe section through which a gas steam flows, a liquid inlet arranged to produce an annulus of liquid around the internal perimeter of the pipe, a sharp edge at the end of the contracting pipe and a further pipe section downstream of the sharp edge.

3. A method as claimed in claim 1 in which the first contactor comprises a vessel including a gas inlet, a liquid inlet and an outlet, the outlet leading to a venturi passage and a tube extending from the outlet back upstream, the tube being perforated and/or being spaced from the periphery of the outlet.

4. A method as claimed in claim 1, in which the first contactor is the same as the second contactor.

5. A method as claimed in any preceding claim in which $H_2S$ is selectively absorbed in preference to $CO_2$.

6. A method as claimed in claim 5, in which the $H_2S$ level in the output gas stream is less than 1.5% by volume, preferably less than 1% by volume.

7. A method as claimed in any preceding claim, in which the liquid stream is an amine stream including entrained hydrocarbons.

8. A method as claimed in claim 7, in which the liquid stream is fed directly to the first contactor from a liquefied petroleum gas (LPG) de-sulphurisation train.

9. A method as claimed in claim 7 or claim 8, in which the amine is selected from MEA, DEIA, DIPA and MDEA.

10. A method as claimed in any preceding claim, in which the liquid phase is subsequently treated to remove any absorbed gas component.

11. A method as claimed in any preceding claim in which 70%, preferably 80% and more preferably 90% of the hydrocarbons in the liquid feed are flashed off into the gas stream.

12. Apparatus for the simultaneous absorption of selected acid gas components from a gas stream and flashing off hydrocarbons entrained in a liquid stream including a solvent or reagent for the selected gas component comprising:

a first co-current contactor where the gas stream and the liquid stream are subjected to turbulent mixing conditions;

a second co-current contactor comprising a housing adapted to be inserted into a pipe and to have a fluid flow pass therethrough, said housing comprising an inlet and an outlet opening respectively, the housing being provided with at least one interior moveable sealingly mounted regulating element partially enclosing a central chamber, to provide first wall portions associated with an upstream side of said housing, and second wall portions associated with a downstream side of said housing, said wall portions being provided with a number of through-going flow channels, each having a substantially smaller cross-sectional area than the flow cross-section of the inlet and outlet openings respectively, and in which the regulating element is adapted to be moveable in relation to said housing; and means for separating the multi-phase flow from the second contactor into a gas phase and a liquid phase.

13. Apparatus as claimed in claim 12, in which the first contactor is a turbulent contactor having a contracting pipe section through which a gas stream flows, a liquid inlet arranged to produce an annulus of liquid around the internal perimeter of the pipe, a sharp edge at the end of the contracting pipe and a further pipe section downstream of the sharp edge.

14. Apparatus as claimed in claim 12, in which the first contactor comprises a vessel including a gas inlet, a liquid inlet and an outlet, the outlet leading to a venturi passage and a tube extending from the outlet back upstream, the tube being perforated and/or being spaced from the periphery of the outlet.

15. Apparatus as claimed in claim 12, in which the first contactor is the same as the second contactor.

* * * * *